United States Patent
Hamamoto et al.

[11] Patent Number: 6,033,809
[45] Date of Patent: Mar. 7, 2000

[54] LITHIUM SECONDARY BATTERY AND ELECTROLYTE THEREOF

[75] Inventors: Toshikazu Hamamoto; Atsuo Hitaka; Yukio Nakada; Koji Abe, all of Ube, Japan

[73] Assignee: UBE Industries, Ltd., Ube, Japan

[21] Appl. No.: 09/137,600

[22] Filed: Aug. 21, 1998

[30] Foreign Application Priority Data

Aug. 22, 1997 [JP] Japan ................................. 9-226157
Apr. 14, 1998 [JP] Japan ............................... 10-102415

[51] Int. Cl.$^7$ .................................................. H01M 10/40
[52] U.S. Cl. ........................................... 429/340; 429/338
[58] Field of Search ...................................... 429/340, 338

[56] References Cited

U.S. PATENT DOCUMENTS

| | | | |
|---|---|---|---|
| 4,472,489 | 9/1984 | Maxfield et al. | 429/213 |
| 4,528,254 | 7/1985 | Wolf et al. | 429/197 |
| 5,196,278 | 3/1993 | Idota | 429/194 |
| 5,260,148 | 11/1993 | Idota | 429/194 |
| 5,462,820 | 10/1995 | Tanaka | 429/174 |
| 5,677,083 | 10/1997 | Tomiyama | 429/194 |

FOREIGN PATENT DOCUMENTS

| | | | |
|---|---|---|---|
| 62-100948 | 3/1987 | Japan | H01M 10/40 |
| 63-102173 | 5/1988 | Japan | H01M 10/40 |

*Primary Examiner*—Stephen Kalafut
*Assistant Examiner*—Carol Chaney
*Attorney, Agent, or Firm*—Burgess, Ryan & Wayne

[57] ABSTRACT

A non-aqueous electrolyte lithium secondary battery comprising a cathode, an anode and a non-aqueous electrolyte comprising an electrolyte dissolved in a non-aqueous solvent, wherein the cathode is composed of a material containing a lithium complex oxide, the anode is composed of a material containing graphite and the non-aqueous solvent contains, as main components, a cyclic carbonate and a linear carbonate and 0.1 to 4% by weight, based upon the total weight of the non-aqueous solvent, of a sultone derivative having the general formula (I):

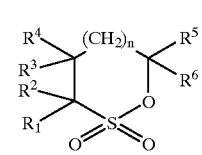

(I)

wherein $R^1$, $R^2$, $R^3$, $R^4$, $R^5$ and $R^6$ independently represent an alkyl group having 1 to 12 carbon atoms, a cycloalkyl group having 3 to 6 carbon atoms, an aryl group having 6 to 12 carbon atoms or a hydrogen atom and n is an integer of 0 to 2.

16 Claims, No Drawings

LITHIUM SECONDARY BATTERY AND ELECTROLYTE THEREOF

BACKGROUND OF THE INVENTION

1. Field of the Invention

The present invention relates to a lithium secondary battery having excellent cycle characteristics of a battery and excellent battery characteristics such as electrical capacity, storage characteristics etc., and an electrolyte thereof.

2. Description of the Related Art

Recently, small-sized or portable electronic equipments become popular, and therefore, as a driving electric source, the developments of high energy density batteries such as secondary batteries are required. As a powerful candidate thereof, lithium-containing composite oxides such as $LiCoO_2$, $LiMn_2O_4$, $LiNiO_2$ are noted as a cathodic material since the high electro motive force can be obtained and, as an anode, carbonaceous materials such as coke, graphite are increasingly noted as an anodic material having a high performance and safety, instead of a lithium secondary battery using a metal lithium anode, since there are no occurrence of a short circuit and also no fall-off of lithium from an anode.

However, when the above-mentioned carbonaceous material is used as an anode, there are problems that the battery capacity is gradually decreased on the carbon anode with the increase in the numbers of charge and discharge cycles due to the decomposition of a non-aqueous solvent. For this reason, it is the present status, that the battery characteristics such as the battery cycle characteristics and electric capacity are not necessarily satisfied.

Especially, in the case of a lithium secondary battery using, as a cathode material, the above lithium-containing composite oxide and using a highly crystallized carbonaceous material such as natural graphite and artificial graphite for the purpose of increasing the battery capacity as an anode, the peeling off of the carbonaceous material is observed and these causes problems, depending upon the degree of the phenomenon thereof, that the battery capacity and the cycle characteristics are decreased. The peeling-off of the carbonaceous material is considered to occur due to the decomposition of the non-aqueous solvent in the electrolyte during the charge. This decomposition of the non-aqueous solvent causing the peeling-off is considered to be caused due to the electrochemical reduction of the non-aqueous solvent in the interface between the carbonaceous material and the electrolyte.

For example, although a cyclic carbonate is suitably used as a non-aqueous solvent, when a cyclic carbonate such as ethylene carbonate (EC) is used, the decomposition of the non-aqueous solvent occurs during the repeated charge and discharge cycle to cause the decrease in the battery characteristics. Among the cyclic carbonate, propylene carbonate (PC) having a low melting point and a high dielectric constant is preferable, as the non-aqueous solvent, due to the high electric conductivity at a low temperature. However, when a highly crystallized graphite is used as the anode material, the decomposition of PC becomes remarkable, and therefore, PC was not able to be used as an electrolyte for a lithium secondary battery.

SUMMARY OF INVENTION

Accordingly, the objects of the present invention are to solve the above-mentioned problems relating to the electrolyte for a lithium secondary battery and to provide a lithium secondary battery having excellent cycle characteristics of a battery and also having excellent battery characteristics such as the electrical capacity and the storage characteristics under the charged condition.

In accordance with the present invention, there is provided a non-aqueous electrolyte lithium secondary battery comprising a cathode, an anode and a non-aqueous electrolyte comprising an electrolyte dissolved in a non-aqueous solvent, wherein the cathode is composed of a material containing a lithium complex oxide, the anode is composed of a material containing graphite and the non-aqueous solvent contains, as main components, a cyclic carbonate and a linear carbonate and 0.1 to 4% by weight, based upon the total weight of the non-aqueous solvent, of a sultone derivative having the general formula (I):

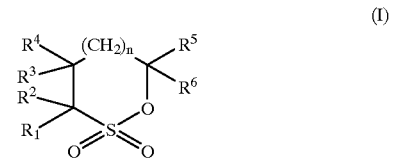

wherein $R^1$, $R^2$, $R^3$, $R^4$, $R^5$ and $R^6$ independently represent an alkyl group having 1 to 12 carbon atoms, a cycloalkyl group having 3 to 6 carbon atoms, an aryl group having 6 to 12 carbon atoms or a hydrogen atom and n is an integer of 0 to 2.

In accordance with the present invention, there is also provided a non-aqueous electrolyte for a lithium secondary battery comprising a cathode composed of a material containing a lithium complex oxide and an anode composed of a material containing a graphite, wherein the non-aqueous electrolyte is composed of an electrolyte dissolved in a non-aqueous solvent and 0.1 to 4% by weight, based upon the total weight of the non-aqueous solvent, of a sultone derivative having the above-mentioned general formula (I).

DETAILED DESCRIPTION OF PREFERRED EMBODIMENTS

The non-aqueous solvents in the present invention include cyclic carbonates, linear carbonates and sultone derivatives having the above formula (I).

The preferable cyclic carbonates is at least one selected from ethylene carbonate (EC), propylene carbonate (PC) and butylene carbonate (BC).

The preferable linear carbonate is at least one selected from dimethyl carbonate (DMC), methylethyl carbonate (MEC) and diethyl carbonate (DEC).

The sultone derivatives according to the present invention are those having the formula (I), wherein $R^1$, $R^2$, $R^3$, $R^4$, $R^5$ and $R^6$ independently represent an alkyl group having 1 to 12 carbon atoms, preferably a methyl, ethyl, propyl, butyl, pentyl or hexyl group. The alkyl group may be a branched alkyl group such as an isopropyl, isobutyl group. Further, the alkyl group may be a cycloalkyl group having 3–6 carbon atoms such as a cyclopropyl, cyclohexyl group. Furthermore, $R^1$–$R^6$ may contain an aryl group having 6 to 12 carbon atoms such as a phenyl, benzyl group or may be a hydrogen atom, n is an integer of 0 to 2.

Typical examples of the sultone derivatives having the above formula (I) are 1,3-propane sultone (i.e., $R^1=R^2=R^3=R^4=R^5=R^6=$a hydrogen atom and n=0), 2,4-butane sultone (i.e., $R^1=$a methyl group, $R^2=R^3=R^4=R^5=R^6=$a hydrogen atom, n=0), 1,3-butane sultone (i.e., $R^6$=a methyl group, $R^1=R^2=R^3=R^4=R^5$=a hydrogen atom, n=0), 2,4-pentane sultone (i.e., $R^1=R^6$=a methyl group, $R^2=R^3=R^4=R^5$=a hydrogen atom, n=0), 2-methyl-2,4-pentane sultone (i.e., $R^1=R^2=R^6$=a methyl group, $R^3=R^4=R^5$=a hydrogen atom, n=0), 4,6-heptane sultone (i.e., $R^1$=a propyl group, $R^6$=a methyl group, $R^2=R^3=R^4=R^5$=a hydrogen atom, n=0), 5-methyl-1,3-hexane sultone (i.e., $R^6$=an isobutyl group, $R^1=R^2=R^3=R^4=R^5$=a hydrogen atom, n=0), 1-phenyl-1,3-butane sultone (i.e., $R^1$=a phenyl group, $R^6$=a methyl group, $R^2=R^3=R^4=R^5$=a hydrogen atom, n=0), 1,8-naphthalene sultone (i.e., $R^1$, $R^2$, $R^3$, $R^4$, $R^5$, $R^6$ are a naphthyl group, n=0), a-hydroxy-o-toluene sulfonic acid-γ-sultone (i.e., $R^1$, $R^2$, $R^3$, $R^4$ are a phenyl group, $R^5=R^6$=a hydrogen atom, n=0), 1,4-butane sultone (i.e., $R^1=R^2=R^3=R^4=R^5=R^6$=a hydrogen atom, n=1), 1,4-hexane sultone (i.e., $R^6$=an ethyl group, $R^1=R^2=R^3=R^4=R^5$=a hydrogen atom, n=1), 1,5-pentane sultone (i.e., $R^1=R^2=R^3=R^4=R^5=R^6$=a hydrogen atom, n=2), etc.

The preferable amounts of the non-aqueous solvent in the electrolyte for the lithium secondary battery according to the present invention are 10 to 70% by weight, more preferably 20 to 50% by weight, of the cyclic carbonate, 30 to 90% by weight, more preferably 50 to 80% by weight, of the linear carbonate and 0.1 to 4% by weight, more preferably 0.5 to 3% by weight, of the sultone derivative.

Examples of the electrolyte usable in the present invention are $LiPF_6$, $LiBF_4$, $LiClO_4$, $LiN(SO_2CF_3)_2$, $LiN(SO_2C_2F_5)_2$, $LiC(SO_2CF_3)_3$, etc. These electrolytes may be used alone or in any mixtures thereof. These electrolytes may be used at a concentration of preferably 0.1–3 M, more preferably 0.5–1.5 M in the above-mentioned non-aqueous solvent in the dissolved form.

The electrolyte according to the present invention may be prepared by, for example, mixing the cyclic carbonate and the linear carbonate, followed by dissolving the electrolyte therein and then dissolving the sultone derivative having the general formula (I) therein.

The other components or members, other than the electrolyte, constituting the secondary battery are various components conventionally used in second batteries.

For example, as the cathode substances (or cathode active substances), composite metal oxides of lithium with at least one metal selected from cobalt, manganese, nickel, chromium, iron and vanadium may be used.

Examples of such composite metal oxides are $LiCoO_2$, $LiMn_2O_4$, $LiNiO_2$, etc.

The cathode are prepared by, for example, mixing the above cathode substance with an electroconductive material such as acetylene black, carbon black and a binder such as polytetrafluoroethylene (PTFE), polyvinylidene fluoride (PVDF) to form a cathode material, followed by coating, drying and pressing, on a collector such as an aluminum foil, a stainless steel foil or a lath plate and then followed by heat treating at a temperature of about 50–250° C. for about 2 hours under vacuum.

As the anode substances (or anode active substances), carbonaceous materials having a graphite type crystal structure capable of intercalation and deintercalation lithium (e.g., pyrotic carbons, cokes, graphites such as natural graphite, artificial graphite etc., organic high molecular substance combustion products, carbon fibers) may be used. Especially, the use of the carbonaceous materials having a graphite type crystal structure wherein a lattice spacing ($d_{002}$) of lattice plane (002) is 3.35 to 3.40 Angstrom. The powder material such as carbon material is mixed with a binder such as ethylene propylene diene terpolymer (EPDM), polytetrafluoroethylene (PTFE), polyvinylidene fluoride (PVDF) to form an anode material for an anode.

In the present invention, the sultone derivatives having the above formula (I) contained in the electrolyte are considered to contribute the formation of a passivation film on the surface of the carbonaceous material and the highly crystallized carbonaceous material due to the activity of, for example, natural graphite and artificial graphite is coated with the passivation film, whereby the decomposition of the electrolyte can be suppressed, without adversely affecting the normal reactions of the battery.

The structure of the lithium secondary battery is not particularly limited. A coin battery having a cathode, anode, and single or multiple layer separators, further, a cylindrical battery, prismatic battery, etc. having a cathode, anode, and roll-shaped separators may be exemplified. Note that, as a separator, a known microporous film, woven fabric, non-woven fabric, etc. of a polyolefin is used.

EXAMPLES

The present invention will now be further explained in detail, but is by no means limited to, the following Examples and Comparative Examples.

Example 1

Preparation of Electrolyte

Commercially available propylene carbonate (PC) and dimethyl carbonate (DMC) are mixed at a weight ratio of 1:1, followed by adding 1,3-propane sultone (PS) thereto to result in a concentration of 0.1% by weight. Thereafter, $LiPF_6$ was dissolved therein at a concentration of 1 M to form an electrolyte solution.

Fabrication of Lithium Secondary Battery and Measurement of Battery Characteristics 80% by weight of $LiCoO_2$ (i.e., a cathode active material), 10% by weight of acetylene black (i.e., an electroconductive material) and 10% by weight of polytetrafluoroethylene (i.e., a binder) were mixed and adding thereto 1-methyl-2-pyrrolidone solvent, followed by mixing and the resultant mixture was coated on an aluminum foil, followed by drying and pressing, to fabricate a cathode. 90% by weight of natural graphite (i.e., an anode active material) and 10% by weight of polyvinylidene fluoride (i.e., a binder) were mixed and then adding thereto 1-methyl-2-pyrrolidone solvent, followed by mixing and the resultant mixture was coated on a copper foil, followed by drying and pressing, to prepare an anode. A separator of a polypropylene microporous film was used and impregnated with the above electrolyte to fabricate a coin battery having a diameter of 20 mm and a thickness of 3.2 mm.

This coin battery was used and repeatedly charged and discharged at room temperature (25° C.) by charging for 5 hours at a constant current of 0.8 mA and a constant voltage until an upper-limited voltage of 4.2V and then by discharging at a constant current of 0.8 mA until a lower-limited voltage of 2.7V. The initial charge capacity and the initial discharge capacity were approximately same as in the case of using EC/DMC(1/1) as an electrolyte (see Comparative Example 1) and, when the battery characteristics after 50 cycle of the charge and discharge was determined, the retention rate of the discharge capacity was 82.3% when the initial discharge capacity was made 100%. The results are shown in Table 1.

Separately, the test was carried out as follows. Namely, the charging was carried out at a room temperature (25° C.) at a constant current and voltage of 0.8 mA for 5 hours until the upper-limited voltage of 4.2V and then the discharging was carried out at −20° C. at a constant current of 0.8 mA until the lower-limited voltage of 2.7V. The initial discharge capacity at this time was 88% as a ratio with the initial discharge capacity at room temperature.

Examples 2–5

The coin battery was fabricated in the same manner as in Example 1, except that the cathode active substance, the anode active substance and the composition of electrolyte shown in Table 1 were used, and the battery characteristics were determined. The retention rate (%) of the discharge capacity after 50 cycles at room temperature is shown in Table 1.

Example 6

The charging and discharging test was carried out in the same manner as in Example 1, except that the cathode active substance was changed from $LiCoO_2$ to $LiMn_2O_4$ and the composition of the electrolyte shown in Table 1 was used. The retention rate of the discharge capacity after 50 cycles at room temperature is shown in Table 1.

Example 7

The coin battery was fabricated in the same manner as in Example 1, except that the anode active substance was changed from natural graphite to artificial graphite (i.e., MCMB available from Osaka Gas Chemical Co.) and the composition of electrolyte shown in Table 1 was used, and the charge and discharge test were determined. The retention rate (%) of the discharge capacity after 50 cycles at room temperature is shown in Table 1.

Comparative Example 1

A lithium secondary battery was fabricated in the same manner as in Example 1, except that the composition of the electrolyte was made at EC/DMC=1/1 and the charging and discharging test was carried out. The retention rate of the discharge capacity after 50 cycles at room temperature is shown in Table 2. Further, the initial discharge capacity at −20° C. was 62% when compared with that at room temperature.

Comparative Example 2

A lithium secondary battery was fabricated in the same manner as in Example 1, except that the composition of the electrolyte was made at PC/DMC=1/1 and the charging and discharging test was carried out. However, in this case, the electrolyte was decomposed at the first charging step and the discharging was not effected. The result is shown in Table 2.

TABLE 1

| Example | Cathode Active Substance | Anode Active Substance | Composition of Electrolyte (wt. ratio) | Retention Rate (%) of Discharge Capacity after 50 cycle |
|---|---|---|---|---|
| 1 | $LiCoO_2$ | Natural Graphite | 1M $LiPF_6$ PS—PC—DMC (0.1/49.95/49.95) | 82.3 |
| 2 | $LiCoO_2$ | Natural Graphite | 1M $LiPF_6$ PS—PC—DMC (1/49.5/49.5) | 87.2 |
| 3 | $LiCoO_2$ | Natural Graphite | 1M $LiPF_6$ PS—PC—DMC (4/32/64) | 86.9 |
| 4 | $LiCoO_2$ | Natural Graphite | 1M $LiPF_6$ PS—PC—DEC (1/49.5/49.5) | 85.2 |
| 5 | $LiCoO_2$ | Natural Graphite | 1M $LiPF_6$ PS—PC—MEC (1/49.5/49.5) | 87.6 |
| 6 | $LiMn_2O_4$ | Natural Graphite | 1M $LiPF_6$ PS—PC—MEC (1/49.5/49.5) | 86.4 |
| 7 | $LiCoO_2$ | Artificial Graphite | 1M $LiPF_6$ PS—PC—EC—DMC (1/20/19/60) | 86.5 |

TABLE 2

| Comparative Example | Cathode Active Substance | Anode Active Substance | Composition of Electrolyte (wt. ratio) | Retention Rate (%) of Discharge Capacity after 50 cycle |
|---|---|---|---|---|
| 1 | $LiCoO_2$ | Natural Graphite | 1M $LiPF_6$ EC—DMC(1/1) | 84.5 |
| 2 | $LiCoO_2$ | Natural Graphite | 1M $LiPF_6$ PC—DMC(1/1) | Charge and Discharge impossible. |

Examples 8–16

Coin batteries were fabricated in the same manner as in Example 1, except that the cathode active substance, the anode active substance, a type of additive, i.e., sultone derivative, the amount of the additive and the composition of the electrolyte shown in Table 3 were used and the battery characteristics were determined.

The retention rates of the discharge capacity at room temperature after 50 cycles are shown in Table 3.

TABLE 3

| Example | Cathode Active Substance | Anode Active Substance | Additive | Addition Amount (wt %) | Composition of Electrolyte (wt. ratio) | Retention Rate (%) of Discharge Capacity after 50 cycle |
|---|---|---|---|---|---|---|
| 8 | $LiCoO_2$ | Natural Graphite | 1,3-Propane Sultone | 1.0 | 1M $LiPF_6$ EC—DMC(1/2) | 92.8 |
| 9 | $LiCoO_2$ | Natural Graphite | 1,3-Propane Sultone | 3.0 | 1M $LiPF_6$ EC—DMC(1/2) | 94.7 |

TABLE 3-continued

| Example | Cathode Active Substance | Anode Active Substance | Additive | Addition Amount (wt %) | Composition of Electrolyte (wt. ratio) | Retention Rate (%) of Discharge Capacity after 50 cycle |
|---|---|---|---|---|---|---|
| 10 | LiCoO$_2$ | Natural Graphite | 1,4-Butane Sultone | 3.0 | 1M LiPF$_6$ EC—DMC(1/2) | 93.6 |
| 11 | LiMn$_2$O$_4$ | Natural Graphite | 1,3-Propane Sultone | 3.0 | 1M LiPF$_6$ EC—DMC(1/2) | 95.5 |
| 12 | LiMn$_2$O$_4$ | Natural Graphite | 1,4-Butane Sultone | 3.0 | 1M LiPF$_6$ EC—DMC(1/2) | 95.2 |
| 13 | LiCoO$_2$ | Natural Graphite | 2,4-Butane Sultone | 3.0 | 1M LiPF$_6$ EC—DMC(1/2) | 92.1 |
| 14 | LiCoO$_2$ | Natural Graphite | 1,3-Butane Sultone | 3.0 | 1M LiPF$_6$ EC—DMC(1/2) | 92.7 |
| 15 | LiCoO$_2$ | Natural Graphite | 2,4-Pentane Sultone | 3.0 | 1M LiPF$_6$ EC—DMC(1/2) | 92.4 |
| 16 | LiCoO$_2$ | Natural Graphite | 1-Phenyl-1,3-Butane Sultone | 3.0 | 1M LiPF$_6$ EC—DMC(1/1) | 91.8 |

It should be noted that the present invention is not limited to the Examples above and includes various combinations easily substitutable from the spirit of the present invention. Especially, the combinations of the solvents shown in above Examples by no means limit the present invention. Furthermore, although the above Examples only relate to coin batteries, the present invention can be applied to cylindrical, prismatic and other batteries.

As explained above, according to the present invention, the lithium secondary batteries having excellent battery characteristics such as the cycle characteristics of battery, the electric capacity and storage characteristics and also excellent low temperature characteristics.

We claim:

1. A non-aqueous electrolyte lithium secondary battery comprising a cathode, an anode and a non-aqueous electrolyte comprising an electrolyte dissolved in a non-aqueous solvent, wherein the cathode is composed of a material containing a lithium complex oxide, the anode is composed of a material containing graphite and the non-aqueous solvent contains, as main components, a cyclic carbonate and a linear carbonate and 0.1 to 4% by weight, based upon the total weight of the non-aqueous solvent, of a sultone derivative having the general formula (I):

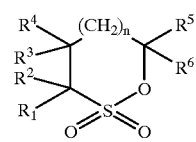

wherein $R^1$, $R^2$, $R^3$, $R^4$, $R^5$ and $R^6$ independently represent an alkyl group having 1 to 12 carbon atoms, a cycloalkyl group having 3 to 6 carbon atoms, an-aryl group having 6 to 12 carbon atoms or a hydrogen atom and n is an integer of 0 to 2.

2. A lithium secondary battery as claimed in claim 1, wherein the content of the cyclic carbonate in the non-aqueous solvent is 10 to 70% by weight, the content of the linear carbonate is 30 to 90% by weight and the content of the sultone derivative is 0.1 to 4% by weight.

3. A lithium secondary battery as claimed in claim 1, wherein said cyclic carbonate is at least one compound selected from the group consisting of ethylene carbonate, propylene carbonate and butylene carbonate.

4. A lithium secondary battery as claimed in claim 1, wherein said linear carbonate is at least one compound selected from dimethyl carbonate, diethyl carbonate and methyl ethyl carbonate.

5. A lithium secondary battery as claimed in claim 1, wherein said graphite is natural graphite or artificial graphite.

6. A lithium secondary battery as claimed in claim 1, wherein said sultone derivative is propane sultone.

7. A lithium secondary battery as claimed in claim 1, wherein said sultone derivative is butane sultone.

8. A lithium secondary battery as claimed in claim 1, wherein the graphite has a lattice spacing ($d_{002}$) of lattice plane (002) of 3.35 to 3.40 Angstrom.

9. A non-aqueous electrolyte for a lithium secondary battery comprising a cathode composed of a material containing a lithium complex oxide and an anode composed of a material containing a graphite, wherein the non-aqueous electrolyte is composed of an electrolyte dissolved in a non-aqueous solvent and 0.1 to 4% by weight, based upon the total weight of the non-aqueous solvent, of a sultone derivative having the general formula (I):

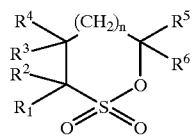

wherein $R^1$, $R^2$, $R^3$, $R^4$, $R^5$ and $R^6$ independently represent an alkyl group having 1 to 12 carbon atoms, a cycloalkyl group having 3 to 6 carbon atoms, an aryl group having 6 to 12 carbon atoms or a hydrogen atom and n is an integer of 0 to 2.

10. A non-aqueous electrolyte as claimed in claim 9, wherein the content of the cyclic carbonate in the non-aqueous solvent is 10 to 70% by weight, the content of the linear carbonate is 30 to 90% by weight and the content of the sultone derivative is 0.1 to 4% by weight.

11. A non-aqueous electrolyte as claimed in claim 9, wherein said cyclic carbonate is at least one compound selected from the group consisting of ethylene carbonate, propylene carbonate and butylene carbonate.

12. A non-aqueous electrolyte as claimed in claim 9, wherein said linear carbonate is at least one compound selected from the group consisting of dimethyl carbonate, diethyl carbonate and methyl ethyl carbonate.

13. A non-aqueous electrolyte as claimed in claim 9, wherein said graphite is natural graphite or artificial graphite.

14. A non-aqueous electrolyte as claimed in claim 9, wherein said sultone derivative is propane sultone.

15. A non-aqueous electrolyte as claimed in claim 9, wherein said sultone derivative is butane sultone.

16. A non-aqueous electrolyte as claimed in claim 9, wherein the graphite has a lattice spacing ($d_{002}$) of lattice plane (002) of 3.35 to 3.40 Angstrom.

* * * * *

(12) EX PARTE REEXAMINATION CERTIFICATE (3rd)
Ex Parte Reexamination Ordered under 35 U.S.C. 257

United States Patent
Hamamoto et al.

(10) Number: US 6,033,809 C1
(45) Certificate Issued: Aug. 27, 2014

(54) LITHIUM SECONDARY BATTERY AND ELECTROLYTE THEREOF

(75) Inventors: Toshikazu Hamamoto, Ube (JP); Atsuo Hitaka, Ube (JP); Koji Abe, Ube (JP)

(73) Assignee: UBE Industries, Ltd., Ube-shi, Yamaguchi (JP)

Supplemental Examination Request:
No. 96/000,041, Sep. 25, 2013

Reexamination Certificate for:
Patent No.: 6,033,809
Issued: Mar. 7, 2000
Appl. No.: 09/137,600
Filed: Aug. 21, 1998

(30) Foreign Application Priority Data

Aug. 22, 1997 (JP) ..................... 9-226157
Apr. 14, 1998 (JP) .................... 10-102415

(51) Int. Cl.
*H01M 10/40* (2006.01)
*H01M 10/36* (2010.01)
*H01M 4/58* (2010.01)
*H01M 10/0569* (2010.01)

(52) U.S. Cl.
CPC ............ *H01M 10/0569* (2013.01); *Y02E 60/12* (2013.01)
USPC .......................................... 429/340; 429/338

(58) Field of Classification Search
None
See application file for complete search history.

(56) References Cited

To view the complete listing of prior art documents cited during the supplemental examination proceeding and the resulting reexamination proceeding for Control Number 96/000,041, please refer to the USPTO's public Patent Application Information Retrieval (PAIR) system under the Display References tab.

*Primary Examiner* — Sean E Vincent

(57) ABSTRACT

A non-aqueous electrolyte lithium secondary battery comprising a cathode, an anode and a non-aqueous electrolyte comprising an electrolyte dissolved in a non-aqueous solvent, wherein the cathode is composed of a material containing a lithium complex oxide, the anode is composed of a material containing graphite and the non-aqueous solvent contains, as main components, a cyclic carbonate and a linear carbonate and 0.1 to 4% by weight, based upon the total weight of the non-aqueous solvent, of a sultone derivative having the general formula (I):

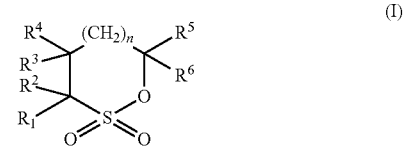

wherein $R^1$, $R^2$, $R^3$, $R^4$, $R^5$ and $R^6$ independently represent an alkyl group having 1 to 12 carbon atoms, a cycloalkyl group having 3 to 6 carbon atoms, an aryl group having 6 to 12 carbon atoms or a hydrogen atom and n is an integer of 0 to 2.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 2 is confirmed.

Claims 1, 9, 13 and 16 are cancelled.

Claims 3-8, 10-12, 14 and 15 are determined to be patentable as amended.

New claims 17-24 are added and determined to be patentable.

3. A lithium secondary battery as claimed in [claim 1] *claim 2*, wherein said cyclic carbonate is at least one compound selected from the group consisting of ethylene carbonate, propylene carbonate and butylene carbonate.

4. A lithium secondary battery as claimed in [claim 1] *claim 2*, wherein said linear carbonate is at least one compound selected from dimethyl carbonate, diethyl carbonate and methyl ethyl carbonate.

5. A lithium secondary battery as claimed in [claim 1] *claim 2*, wherein said graphite is natural graphite or artificial graphite.

6. A lithium secondary battery as claimed in [claim 1] *claim 2*, wherein said sultone derivative is propane sultone.

7. A lithium secondary battery as claimed in [claim 1] *claim 2*, wherein said sultone derivative is butane sultone.

8. A lithium secondary battery as claimed in [claim 1] *claim 2*, wherein the graphite has a lattice spacing ($d_{002}$) of lattice plane (002) of 3.35 to 3.40 Angstrom.

10. A non-aqueous electrolyte as claimed in claim 9, wherein [the] *a* content of [the] cyclic carbonate in the non-aqueous solvent is 10 to 70% by weight, [the] *a* content of [the] linear carbonate is 30 to 90% by weight and the content of the sultone derivative is 0.1 to 4% by weight.

11. A non-aqueous electrolyte as claimed in [claim 9] *claim 10*, wherein said cyclic carbonate is at least one compound selected from the group consisting of ethylene carbonate, propylene carbonate and butylene carbonate.

12. A non-aqueous electrolyte as claimed in [claim 9] *claim 10*, wherein said linear carbonate is at least one compound selected from the group consisting of dimethyl carbonate, diethyl carbonate and methyl ethyl carbonate.

14. A non-aqueous electrolyte as claimed in [claim 9] *claim 10*, wherein said sultone derivative is propane sultone.

15. A non-aqueous electrolyte as claimed in [claim 9] *claim 10*, wherein said sultone derivative is butane sultone.

*17. A lithium secondary battery as claimed in claim 2, wherein the cyclic carbonate comprises ethylene carbonate.*

*18. A lithium secondary battery as claimed in claim 2, wherein the cyclic carbonate comprises propylene carbonate.*

*19. A lithium secondary battery as claimed in claim 2, wherein:*
 *the cyclic carbonate comprises ethylene carbonate;*
 *the linear carbonate comprises at least one of dimethyl carbonate, diethyl carbonate, and methyl ethyl carbonate; and*
 *the sultone derivative comprises propane sultone or butane sultone.*

*20. A lithium secondary battery as claimed in claim 2, wherein:*
 *the cyclic carbonate comprises propylene carbonate;*
 *the linear carbonate comprises at least one of dimethyl carbonate, diethyl carbonate, and methyl ethyl carbonate; and*
 *the sultone derivative comprises propane sultone or butane sultone.*

*21. A non-aqueous electrolyte as claimed in claim 10, wherein the cyclic carbonate comprises ethylene carbonate.*

*22. A non-aqueous electrolyte as claimed in claim 10, wherein the cyclic carbonate comprises propylene carbonate.*

*23. A non-aqueous electrolyte as claimed in claim 10, wherein:*
 *the cyclic carbonate comprises ethylene carbonate;*
 *the linear carbonate comprises at least one of dimethyl carbonate, diethyl carbonate, and methyl ethyl carbonate; and*
 *the sultone derivative comprises propane sultone or butane sultone.*

*24. A non-aqueous electrolyte as claimed in claim 10, wherein:*
 *the cyclic carbonate comprises propylene carbonate;*
 *the linear carbonate comprises at least one of dimethyl carbonate, diethyl carbonate, and methyl ethyl carbonate; and*
 *the sultone derivative comprises propane sultone or butane sultone.*

\* \* \* \* \*